US009988282B2

(12) United States Patent
Urbani et al.

(10) Patent No.: US 9,988,282 B2
(45) Date of Patent: *Jun. 5, 2018

(54) SURFACTANT BASED SMALL MOLECULES FOR REDUCING ALUMINOSILICATE SCALE IN THE BAYER PROCESS

(71) Applicant: Nalco Company, Naperville, IL (US)

(72) Inventors: Carl Nicholas Urbani, Lesmurdie (AU); Timothy La, Kardinya (AU); John David Kildea, Baldivis (AU)

(73) Assignee: Ecolab USA Inc., St. Paul, MN (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/237,841

(22) Filed: Aug. 16, 2016

(65) Prior Publication Data
US 2017/0066656 A1 Mar. 9, 2017

Related U.S. Application Data

(63) Continuation of application No. 14/151,368, filed on Jan. 9, 2014, now Pat. No. 9,416,020, which is a continuation-in-part of application No. 13/403,282, filed on Feb. 23, 2012, now Pat. No. 9,487,408, which is a continuation-in-part of application No.
(Continued)

(51) Int. Cl.
C01F 7/02 (2006.01)
C01F 7/06 (2006.01)
C23F 14/02 (2006.01)

(52) U.S. Cl.
CPC .......... C01F 7/0633 (2013.01); C01F 7/0606 (2013.01); C23F 14/02 (2013.01)

(58) Field of Classification Search
None
See application file for complete search history.

(56) References Cited

U.S. PATENT DOCUMENTS 5,118,484 A 6/1992 The et al.
5,314,626 A 5/1994 Dimas
(Continued)

FOREIGN PATENT DOCUMENTS

WO WO 96/06043 A1 2/1996
WO WO 97/41065 A1 11/1997
(Continued)

OTHER PUBLICATIONS

Korean Intellectual Property Office, International Search Report in International Patent Application No. PCT/US2010/049555, dated Jun. 24, 2011, 4 pp.
(Continued)

Primary Examiner — Xiaoyun R Xu
(74) Attorney, Agent, or Firm — Leydig, Voit & Mayer, LTD.

(57) ABSTRACT

The invention provides methods and compositions for inhibiting the accumulation of DSP scale in the liquor circuit of Bayer process equipment. The method includes adding one or more GPS-surfactant based small molecules to the liquor fluid circuit. These scale inhibitors reduce DSP scale formation and thereby increase fluid throughput, increase the amount of time Bayer process equipment can be operational and reduce the need for expensive and dangerous acid washes of Bayer process equipment. As a result, the invention provides a significant reduction in the total cost of operating a Bayer process.

15 Claims, 7 Drawing Sheets

Related U.S. Application Data

12/567,116, filed on Sep. 25, 2009, now Pat. No. 8,545,776.

(56) References Cited

U.S. PATENT DOCUMENTS

| | | |
|---|---|---|
| 5,415,782 A | 5/1995 | Dimas |
| 5,650,072 A | 7/1997 | McClain et al. |
| 6,086,771 A | 7/2000 | Selvarajan et al. |
| 6,569,908 B2 | 5/2003 | Noguchi et al. |
| 6,808,768 B2 | 10/2004 | Satou et al. |
| 6,814,873 B2 | 11/2004 | Spitzer et al. |
| 6,867,318 B1 | 3/2005 | Cui |
| 7,390,415 B2 | 6/2008 | Spitzer et al. |
| 7,442,755 B2 | 10/2008 | Spitzer et al. |
| 7,763,698 B2 | 7/2010 | Spitzer et al. |
| 2004/0011744 A1 | 1/2004 | Spitzer et al. |
| 2004/0162406 A1 | 8/2004 | Spitzer et al. |
| 2005/0010008 A2 | 1/2005 | Spitzer et al. |
| 2005/0231436 A1 | 10/2005 | McLean et al. |
| 2007/0178041 A1 | 8/2007 | Tizon et al. |
| 2007/0231249 A1 | 10/2007 | Batllo et al. |
| 2008/0111103 A1 | 5/2008 | Heitner et al. |
| 2009/0008335 A1 | 1/2009 | Flocken et al. |
| 2009/0026064 A1 | 1/2009 | McCausland et al. |
| 2010/0256317 A1 | 10/2010 | Spitzer et al. |
| 2011/0076209 A1 | 3/2011 | La et al. |
| 2011/0212006 A1 | 9/2011 | La et al. |
| 2012/0148462 A1 | 6/2012 | Phillips et al. |
| 2013/0189529 A1 | 7/2013 | Kildea et al. |
| 2013/0343970 A1 | 12/2013 | La et al. |

FOREIGN PATENT DOCUMENTS

| | | |
|---|---|---|
| WO | WO 97/41075 A1 | 11/1997 |
| WO | WO 2002/070411 A1 | 9/2002 |
| WO | WO 2006/003470 A1 | 1/2006 |
| WO | WO 2008/017109 A1 | 2/2008 |
| WO | WO 2008/045677 A1 | 4/2008 |

OTHER PUBLICATIONS

Korean Intellectual Property Office, International Search Report in International Patent Application No. PCT/US2012/024099,m dated Aug. 22, 2012, 4 pp.

Oliveira et al., "Performance Appraisal of Evaporation System with Scale Inhibitor Application in Alunorte Plant," *Light Metals 2008* (2008), pp. 133-136.

Robson, "Product Silica Control Options," *Light Metals* (1998), pp. 87-94.

Spitzer et al., "Reagents for the elimination of sodalite scaling," *Light Metals 2005* (2005), pp. 183-188.

Spitzer et al., "Max HT™ Sodalite Scale Inhibitor: Plant Experience and Impact on the Process," *Light Metals 2008* (2008), pp. 57-62.

The, "A Novel Approach to Post-Desilicating Bayer Process Liquor," *Light Metals* 1992 (1992), pp. 117-122.

European Patent Office, Extended European Search Report in European Patent Application No. 14878084.4, dated Jul. 17, 2017, 8 pp.

| Type | Product ID | Surfactant | Hydrophobe | Amine Binder | Epoxide Binder | Moles Surfactant | Moles GPS | Moles Hydrophobe | Moles Amine Binder | Moles Epoxide Binder | Method |
|---|---|---|---|---|---|---|---|---|---|---|---|
| 1.1 | A | G12A7 | | | | 1 | 1 | | | | I |
| | B | G12A4 | | | | 1 | 1 | | | | I |
| | C | G17A3 | | | | 1 | 1 | | | | I |
| | D | C9A6 | | | | 1 | 1 | | | | I |
| | E | C9A8 | | | | 1 | 1 | | | | I |
| 1.2 | F | 18M20 | | | | 1 | 1 | | | | I |
| | G | 18M2 | | | | 1 | 1 | | | | I |
| | H | 16M2 | | | | 1 | 0.1 | | | | I |
| | J | 16M2 | | | | 1 | 0.25 | | | | I |
| | K | 16M2 | | | | 1 | 0.5 | | | | I |
| | L | 16M2 | | | | 1 | 1 | | | | I |
| | M | TAM5 | | | | 1 | 0.5 | | | | I |
| | N | TAM5 | | | | 1 | 2 | | | | I |
| 1.3 | O | TAM5 | | | | 1 | 1 | | | | I |
| | P | DPD | | | | 1 | 1 | | | | II |
| | Q | OPD | | | | 1 | 1 | | | | II |
| 2.1 | R | 18M20 | C8-C18 | | | 1 | 1 | 1 | | | I |
| | S | TAM5 | C8-C18 | | | 1 | 1 | 1 | | | I |
| | T | TAM5 | C8-C18 | | | 1 | 1 | 0.3 | | | I |
| 2.2 | U | DPD | C8-C18 | | | 1 | 1 | 1 | | | II |
| | V | DPD | C8-C18 | | | 1 | 1 | 2 | | | II |
| 3.1 | X | DPD | | | EGDGE | 2 | 2 | | | 1 | III |
| | Y | DPD | | | EGDGE | 2 | 1 | | | 1 | III |
| | Z | OPD | | | EGDGE | 2 | 2 | | | 1 | III |
| | ZA | OPD | | | EGDGE | 2 | 1 | | | 1 | III |

FIG. 3

| Type | Product ID | Surfactant | Hydrophobe | Amine Binder | Epoxide Binder | Moles Surfactant | Moles GPS | Moles Hydrophobe | Moles Amine Binder | Moles Epoxide Binder | DMSO % | Method |
|---|---|---|---|---|---|---|---|---|---|---|---|---|
| 4.1 | AA | DPD | | ED | EGDGE | 2 | 1 | | 1 | 2 | | IV |
| | BB | DPD | | ED | EGDGE | 2 | 2 | | 1 | 2 | | IV |
| | CC | DPD | | ED | EGDGE | 2 | 1 | | 2 | 3 | | IV |
| | DD | DPD | | ED | EGDGE | 2 | 2 | | 2 | 3 | | IV |
| | EE | DPD | | ED | EGDGE | 2 | 1 | | 3 | 4 | | IV |
| | FF | DPD | | ED | EGDGE | 2 | 3 | | 3 | 4 | | IV |
| | GG | DPD | | ED | EGDGE | 2 | 3 | | 2 | 3 | | V |
| | HH | DPD | | ED | EGDGE | 2 | 2 | | 3 | 4 | | V |
| 4.2 | JJ | DPD | | TEPA | EPI | 2 | 1 | | 2 | 3 | | V |
| | KK | DPD | | TEPA | EPI | 2 | 2 | | 1 | 2 | 15 | X |
| 4.3 | LL | OA | | TEPA | EPI | 2 | 2 | | 2 | 3 | 25 | VI |
| | MM | OLA | | TEPA | EPI | 2 | 2 | | 2 | 3 | 25 | VI |

FIG. 4

| Type | Product ID | Surfactant | Amine Binder | Epoxide Binder | Amine Binder #2 | Moles Surfactant | Moles GPS | Moles Amine Binder #1 | Moles Epoxide Binder | Moles Amine Binder #2 | DMSO Solvent % | Method |
|---|---|---|---|---|---|---|---|---|---|---|---|---|
| 4.2 | JJ | DPD | TEPA | EPI | | 2 | 2 | 2 | 3 | | | V |
| 4.1 | KK | DPD | TEPA | EPI | | 2 | 1 | 1 | 2 | | 15 | X |
|  | SA | DPD | ED | EGDGE | | 2 | 0.5 | 1 | 2 | | | V |
|  | SB | DPD | ED | EGDGE | | 2 | 0.5 | 2 | 3 | | | V |
|  | SC | DPD | ED | EGDGE | | 2 | 1 | 1 | 2 | | | V |
|  | SD | DPD | ED | EGDGE | | 2 | 2 | 1 | 2 | | | V |
|  | SE | DPD | ED | EGDGE | | 2 | 3 | 1 | 2 | | | V |
| 4.4 | SF | DPD | TEPA | EGDGE | | 2 | 1 | 2 | 2 | | | V |
|  | SG | DPD | TEPA | EGDGE | | 2 | 2 | 2 | 2 | | | V |
|  | SH | DPD | TEPA | EGDGE | | 2 | 3 | 2 | 2 | | | V |
| 4.1 | SI | DPD | ED | EGDGE | | 2 | 1 | 2 | 3 | | | V |
|  | SJ | DPD | ED | EGDGE | | 2 | 2 | 2 | 3 | | | V |
|  | SK | DPD | ED | EGDGE | | 2 | 3 | 2 | 3 | | | V |
|  | SL | DPD | ED | EGDGE | | 2 | 1 | 3 | 4 | | | V |
|  | SM | DPD | ED | EGDGE | | 2 | 2 | 3 | 4 | | | V |
|  | SN | DPD | ED | EGDGE | | 2 | 3 | 3 | 4 | | | V |
| 4.5 | SO | DPD | TEPA | EGDGE | ED | 2 | 1 | 1 | 3 | 1 | | V |
|  | SP | DPD | TEPA | EGDGE | ED | 2 | 2 | 1 | 3 | 1 | | V |
|  | SQ | DPD | TEPA | EGDGE | ED | 2 | 3 | 1 | 3 | 1 | | V |
| 4.4 | SR | DPD | TEPA | EGDGE | | 2 | 1 | 2 | 3 | | | V |
|  | ST | DPD | TEPA | EGDGE | | 2 | 2 | 2 | 3 | | | V |
|  | SU | DPD | TEPA | EGDGE | | 2 | 3 | 2 | 3 | | | V |

FIG. 5

| Sample | | | | | | | | | | Example |
|---|---|---|---|---|---|---|---|---|---|---|
| SV | DPD | TEPA | EPI | 2 | 1 | 2 | 3 | | | V |
| SW | DPD | TEPA | EPI | 2 | 2 | 2 | 3 | | | V |
| SX | DPD | TEPA | EPI | 2 | 3 | 3 | 3 | | | V |
| AS | DPD | TEPA | EPI | 2 | 2 | 2 | 2.5 | | | VII |
| BS | DPD | TEPA | EPI | 2 | 2 | 2 | 3 | | | VIII |
| CS | DPD | TEPA | EPI | 2 | 2 | 2 | 3 | 15 | | IX |
| DS | DPD | TEPA | EPI | 2 | 2 | 2 | 3 | 15 | | X |
| ES | DPD | TEPA | EPI | 2 | 1 | 1 | 3 | 15 | | XI |
| FS | DPD | TEPA | EPI | 2 | 1 | 1 | 2 | 16.6 | | XII |
| GS | DPD | TEPA | EPI | 2 | 2 | 2 | 2 | 16.6 | | XIII |
| HS | DPD | TEPA | EPI | 2 | 2 | 2 | 3 | 25 | | VI |

FIG. 6

SURFACTANT BASED SMALL MOLECULES FOR REDUCING ALUMINOSILICATE SCALE IN THE BAYER PROCESS

CROSS-REFERENCE TO RELATED APPLICATIONS

This application is a continuation of co-pending U.S. patent application Ser. No. 14/151,368, filed Jan. 9, 2014, issued as U.S. Pat. No. 9,416,020, itself a continuation-in-part of U.S. patent application Ser. No. 13/403,282, filed Feb. 23, 2012, issued as U.S. Pat. No. 9,487,408, itself a continuation-in-part of U.S. patent application Ser. No. 12/567,116, filed Sep. 25, 2009, issued as U.S. Pat. No. 8,545,776 the disclosures of which are herein incorporated by reference in their entireties.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving treatment and inhibition of scale in various industrial process streams, in particular certain surfactant based small molecules that have been found to be particularly effective in treating aluminosilicate scale in a Bayer process stream.

As described among other places in U.S. Pat. No. 6,814,873 the contents of which are incorporated by reference in their entirety, the Bayer process is used to manufacture alumina from Bauxite ore. The process uses caustic solution to extract soluble alumina values from the bauxite. After dissolution of the alumina values from the bauxite and removal of insoluble waste material from the process stream the soluble alumina is precipitated as solid alumina trihydrate. The remaining caustic solution known as "liquor" and/or "spent liquor" is then recycled back to earlier stages in the process and is used to treat fresh bauxite. It thus forms a fluid circuit. For the purposes of this application, this description defines the term "liquor". The recycling of liquor within the fluid circuit however has its own complexities.

Bauxite often contains silica in various forms and amounts. Some of the silica is unreactive so it does not dissolve and remains as solid material within the Bayer circuit. Other forms of silica (for example clays) are reactive and dissolve in caustic when added into Bayer process liquors, thus increasing the silica concentration in the liquor. As liquor flows repeatedly through the circuit of the Bayer process, the concentration of silica in the liquor further increases, eventually to a point where it reacts with aluminum and soda to form insoluble aluminosilicate particles. Aluminosilicate solid is observed in at least two forms, sodalite and cancrinite. These and other forms of aluminosilicate are commonly referred to, and for the purposes of this application define, the terms "desilication product" or "DSP".

DSP can have a formula of $3(Na_2O.Al_2O_3.2SiO_2.0-2 H_2O).2NaX$ where X represents $OH^-$, $Cl^-$, $CO_3^{2-}$, $SO_4^{2-}$. Because DSP has an inverse solubility (precipitation increases at higher temperatures) and it can precipitate as fine scales of hard insoluble crystalline solids, its accumulation in Bayer process equipment is problematic. As DSP accumulates in Bayer process pipes, vessels, heat transfer equipment, and other process equipment, it forms flow bottlenecks and obstructions and can adversely affect liquor throughput. In addition because of its thermal conductivity properties, DSP scales on heat exchanger surfaces reduce the efficiency of heat exchangers.

These adverse effects are typically managed through a descaling regime, which involves process equipment being taken off line and the scale being physically or chemically treated and removed. A consequence of this type of regime is significant and regular periods of down-time for critical equipment. Additionally as part of the descaling process the use of hazardous concentrated acids such as sulfuric acid are often employed and this constitutes an undesirable safety hazard.

Another way Bayer process operators manage the buildup of silica concentration in the liquor is to deliberately precipitate DSP as free crystals rather than as scale. Typically a "desilication" step in the Bayer process is used to reduce the concentration of silica in solution by precipitation of silica as DSP, as a free precipitate. While such desilication reduces the overall silica concentration within the liquor, total elimination of all silica from solution is impractical and changing process conditions within various parts of the circuit (for example within heat exchangers) can lead to changes in the solubility of DSP, resulting in consequent precipitation as scale.

Previous attempts at controlling and/or reducing DSP scale in the Bayer process have included adding polymer materials containing three alkyloxy groups bonded to one silicon atom as described in U.S. Pat. No. 6,814,873 B2, US published applications 2004/0162406 A1, 2004/0011744 A1, 2005/0010008 A2, international published application WO 2008/045677 A1, and published article *Max HTTM Sodalite Scale Inhibitor: Plant Experience and Impact on the Process*, by Donald Spitzer et. al., Pages 57-62, Light Metals 2008, (2008) all of whose contents are incorporated by reference in their entirety.

Manufacturing and use of these trialkoxysilane-grafted polymers however can involve unwanted degrees of viscosity, making handling and dispersion of the polymer through the Bayer process liquor problematic. Other previous attempts to address foulant buildup are described in U.S. Pat. Nos. 5,650,072 and 5,314,626 both of which are incorporated by reference in their entirety.

Thus while a range of methods are available to Bayer process operators to manage and control DSP scale formation, there is a clear need for, and utility in, an improved method of preventing or reducing DSP scale formation on Bayer process equipment. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

To satisfy the long-felt but unsolved needs identified above, at least one embodiment of the invention is directed towards a method for reducing siliceous scale in a Bayer process comprising the step of adding to a Bayer liquor an aluminosilicate scale reducing amount of a non-polymeric reaction product resulting from the reaction of: a) a surfactant and b) a GPS.

The non-polymeric reaction product may be a resultant from the reaction of items further comprising one item selected from the group consisting of at least one: hydrophobe, amine binder, epoxide binder, and any combination thereof. The GPS may be 3-glycidoxypropyltrimethoxysilane. The surfactant may be one selected from the group consisting of: ethoxylated fatty alcohols, ethoxylated fatty amines, fatty amines, G12A7, G12A4, G17A3, G9A6, G9A8, 18M20, 18M2, 16M2, DPD, OPD, OLA, and any combination thereof. The epoxide binder may be a molecule according to formulas (I), (II), and any combination thereof:

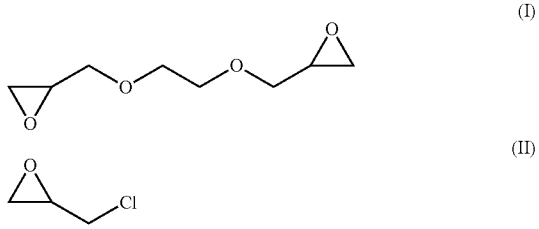

The hydrophobe may be a C8-C10 aliphatic glycidyl ether. The reaction product may have a molecular weight of less than 500 daltons. The reaction product may be according to the formula illustrated in FIG. 1, FIG. 2, and/or may be Product P, Product U, and/or Product HS.

The reaction product may be formed at least in part according to one of the methods selected from the group consisting of Methods: I, II, III, IV, V, VI, VII, VIII, IX, X, XI, XII, and XIII, and any combination thereof. The amine binder may be one selected from the list consisting of: tetraethylenepentamine and ethylenediamine.

Additional features and advantages are described herein, and will be apparent from the following Detailed Description.

BRIEF DESCRIPTION OF THE DRAWINGS

A detailed description of the invention is hereafter described with specific reference being made to the drawings in which:

FIG. 3 is a first table of Formula types used in the invention.

FIG. 4 is a second table of Formula types used in the invention.

FIG. 5 is a third table of Formula types used in the invention.

FIG. 6 is a fourth table of Formula types used in the invention

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
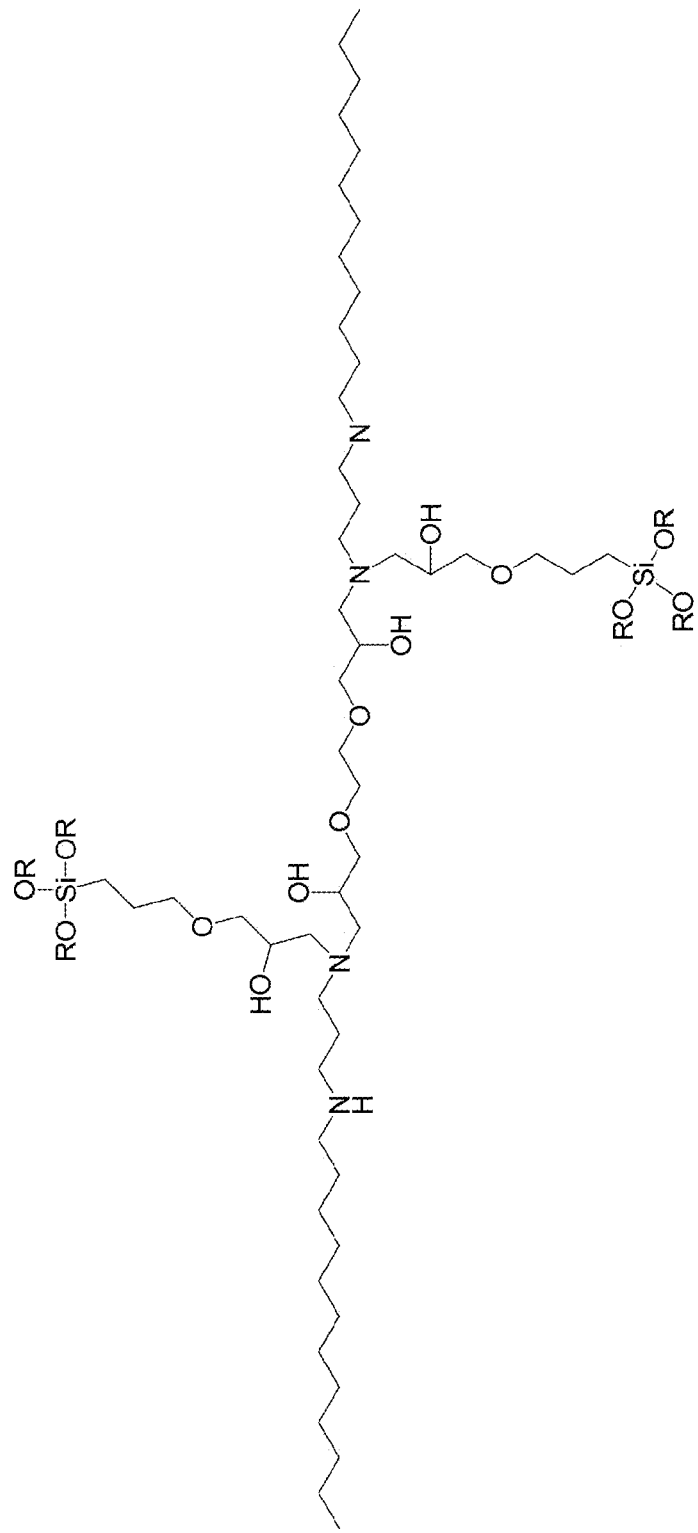
FIG. 1 is an illustration of the formula of reaction product X.

The following definitions are provided to determine how terms used in this application, and in particular how the claims, are to be construed. The organization of the definitions is for convenience only and is not intended to limit any of the definitions to any particular category.

"Polymer" means a chemical compound comprising essentially repeating structural units each containing two or more atoms. While many polymers have large molecular weights of greater than 500, some polymers such as polyethylene can have molecular weights of less than 500. Polymer includes copolymers and homo polymers.

"Small molecule" means a chemical compound comprising essentially non-repeating structural units. Because an oligomer (with more than 10 repeating units) and a polymer are essentially comprised of repeating structural units, they are not small molecules. Small molecules can have molecular weights above and below 500. The terms "small molecule" and "polymer" are mutually exclusive.

"Foulant" means a material deposit that accumulates on equipment during the operation of a manufacturing and/or chemical process which may be unwanted and which may impair the cost and/or efficiency of the process. DSP is a type of foulant.

"Amine" means a molecule containing one or more nitrogen atoms and having at least one secondary amine or primary amine group. By this definition, monoamines such as dodecylamine, diamines such as hexanediamine, and triamines such as diethylenetriamine, are all amines.

"GPS" is glycidoxyalkyltrimethoxysilane which includes 3-glycidoxypropyltrimethoxysilane, one possible formula for GPS can be represented by the structure:

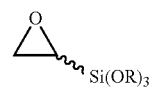

"Ethoxylated Alcohol" means an alcohol according to the formula:

R—(EO)$_n$—OH

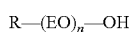

wherein EO is an ethoxy group (—OCH2CH2—) and n is an integer within the range 1-50.

"Ethoxylated Amine" means an amine according to the formula:

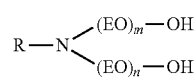

wherein EO is an ethoxy group (—OCH2CH2—), m is an integer within the range 1-50, and n is an integer within the range 1-50.

"G12A7" means a C12-C14 non-ionic alcohol ethoxylate surfactant, a representative example of which is Teric G12A7 sold by Huntsman.

"G12A4" means a C12-C14 non-ionic alcohol ethoxylate surfactant, a representative example of which is Teric G12A4 sold by Huntsman.

"G17A3" means a C16-C18 straight chain non-ionic alcohol ethoxylate surfactant, a representative example of which is Teric G17A3 sold by Huntsman.

"G9A6" means a C9-C11 straight chain non-ionic alcohol ethoxylate surfactant, a representative example of which is Teric G9A6 sold by Huntsman.

"G9A8" means a C9-C11 straight chain non-ionic alcohol ethoxylate surfactant, a representative example of which is Teric G9A8 sold by Huntsman.

"18M20" means a C18-C22 alkyl amine ethoxylate surfactant, a representative example of which is Teric 18M20 sold by Huntsman.

"18M2" means a C18-C22 alkyl amine ethoxylate surfactant, a representative example of which is Teric 18M2 sold by Huntsman.

"16M2" means a C16-C18 alkyl amine ethoxylate surfactant, a representative example of which is Teric 16M2 sold by Huntsman.

"TAM5" means tallow alkyl amine ethoxylate surfactant, a representative example of which is Agnique TAM5 sold by Cognis.

"DPD" means dodecyl-1,3-propanediamine

"EGDGE" means ethylene glycol diglycidylether

"OPD" means oleyl-1,3-propanediamine

"EPI" means epichlorohydrin

"OA" means octylamine

"ED" means ethylenediamine

"OLA" means oleylamine

"TEPA" means tetraethylenepentamine

"AGE" means C8-C10 aliphatic glycidyl ether

"Alkyloxy" means having the structure of OX where X is a hydrocarbon and O is oxygen. It can also be used interchangeably with the term "alkoxy". Typically in this application, the oxygen is bonded both to the X group as well as to a silicon atom of the small molecule. When X is $C_1$ the alkyloxy group consists of a methyl group bonded to the oxygen atom. When X is $C_2$ the alkyloxy group consists of an ethyl group bonded to the oxygen atom. When X is $C_3$ the alkyloxy group consists of a propyl group bonded to the oxygen atom. When X is $C_4$ the alkyloxy group consists of a butyl group bonded to the oxygen atom. When X is $C_5$ the alkyloxy group consists of a pentyl group bonded to the oxygen atom. When X is $C_6$ the alkyloxy group consists of a hexyl group bonded to the oxygen atom.

"Monoalkyloxy" means that attached to a silicon atom is one alkyloxy group.

"Dialkyloxy" means that attached to a silicon atom are two alkyloxy groups.

"Trialkyloxy" means that attached to a silicon atom are three alkyloxy groups.

"Synthetic Liquor" or "Synthetic Spent Liquor" is a laboratory created liquid used for experimentation whose composition in respect to alumina, soda, and caustic corresponds with the liquor produced by recycling through the Bayer process.

"Bayer Liquor" is actual liquor that has run through a Bayer process in an industrial facility.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

In the Bayer process for manufacturing alumina, bauxite ore passes through a grinding stage and alumina, together with some impurities including silica, are dissolved in added liquor. The mixture then typically passes through a desilication stage where silica is deliberately precipitated as DSP to reduce the amount of silica in solution. The slurry is passed on to a digestion stage where any remaining reactive silica dissolves, thus again increasing the concentration of silica in solution which may subsequently form more DSP as the process temperature increases. The liquor is later separated from undissolved solids, and alumina is recovered by precipitation as gibbsite. The spent liquor completes its circuit as it passes through a heat exchanger and back into the grinding stage. DSP scale accumulates throughout the Bayer process but particularly at the digestion stage and most particularly at or near the heat exchanger, where the recycled liquor passes through.

Figure 2:
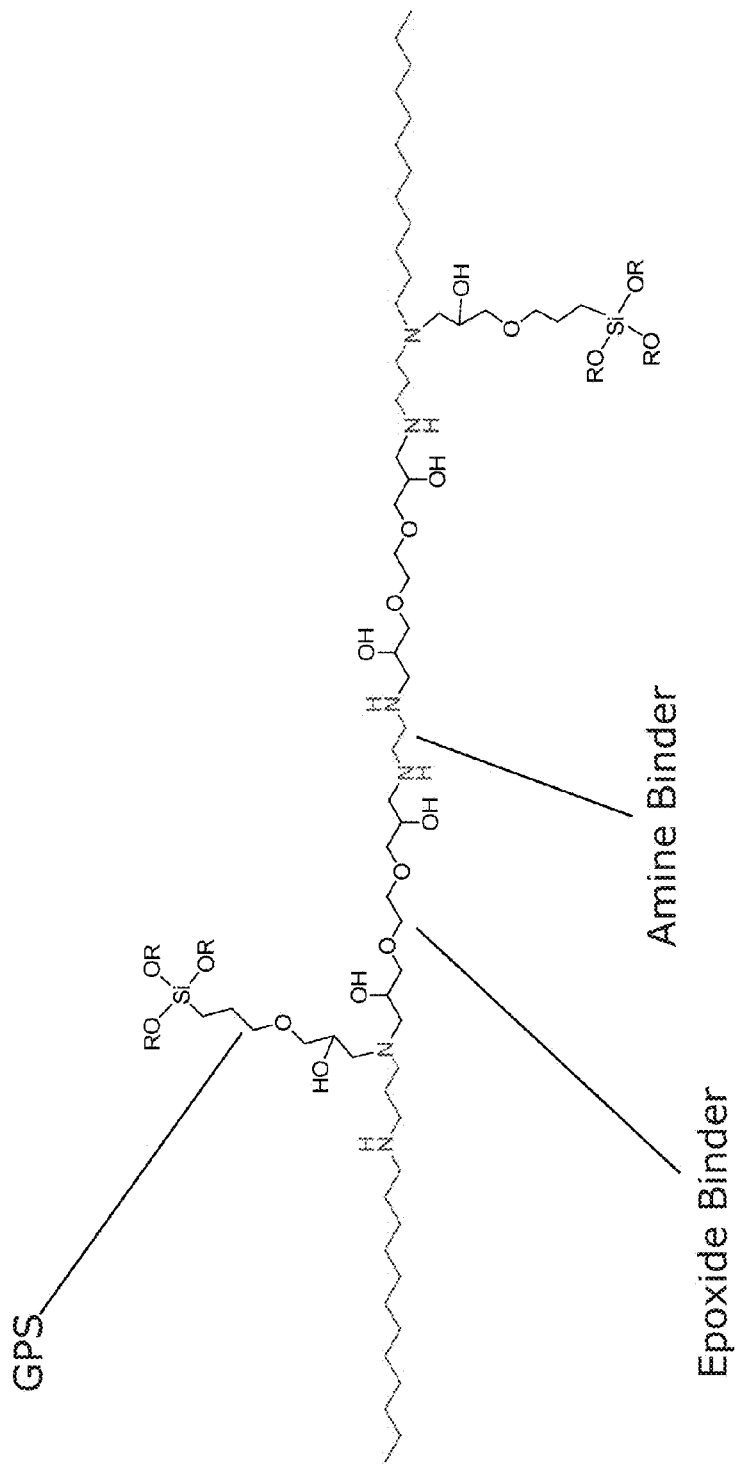
FIG. 2 is an illustration of the formula of reaction product BB.
Figure 7:
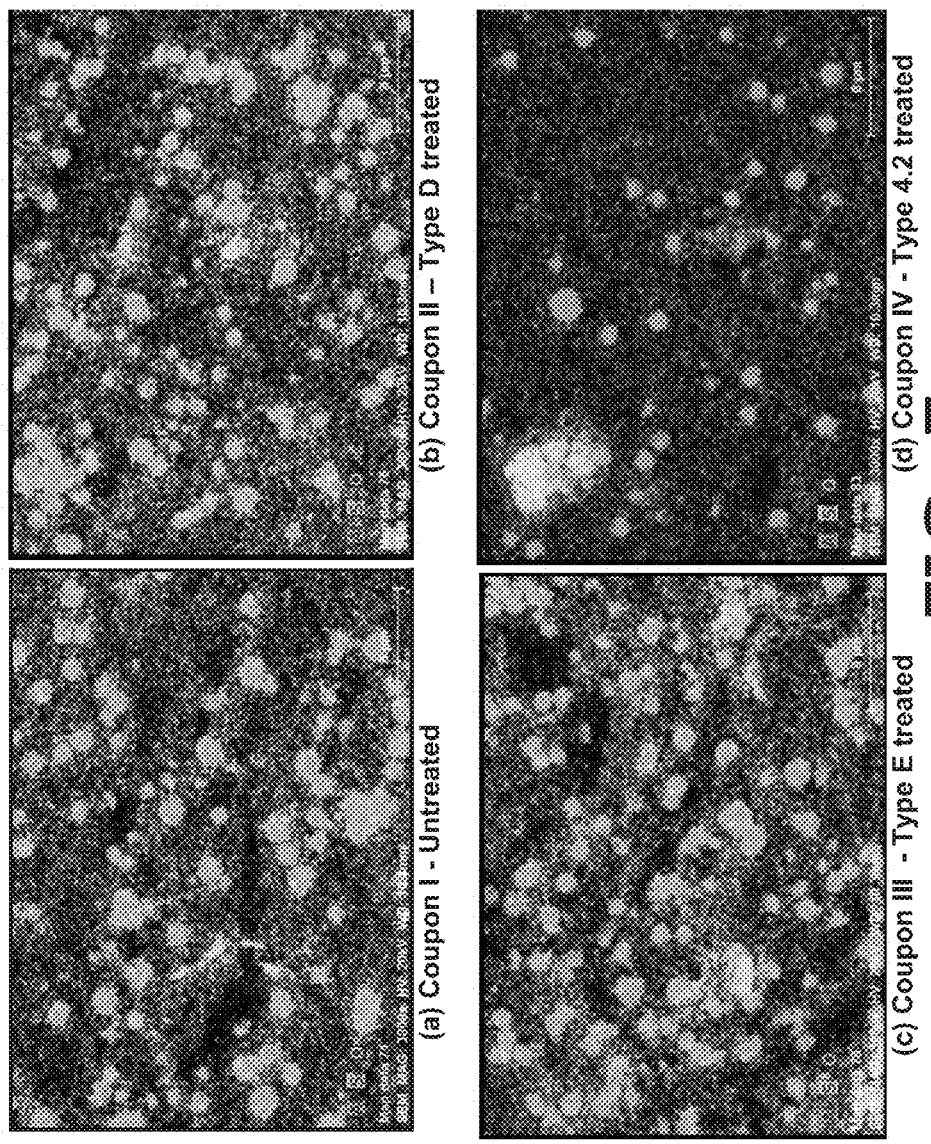
FIG. 7 is an illustration of SEM (Scanning Electron Microscope) analysis demonstrating the efficacy of the invention.

In this invention, it was discovered that dosing of various types of small molecule based products can reduce the amount of DSP scale formed. The small molecules are reaction products of surfactants with GPS and optionally also with one or more of: hydrophobes, amine binders, epoxide binders, and any combination thereof. FIG. 1 and FIG. 2 show representative structures of small molecules constituted by combinations of surfactant, GPS and epoxide binder (FIG. 1) and surfactant, GPS, epoxide binder and amine binder (FIG. 2) and which are examples of the possible reaction product combinations encompassed by this embodiment. In at least one embodiment of the invention, an effective concentration of the small molecule product is added to some point or stage in the liquor circuit of the Bayer process, which minimizes or prevents the accumulation of DSP on vessels or equipment along the liquor circuit.

As described in U.S. Pat. No. 8,545,776 the small molecule DG12 is an example of a small molecule which is a reaction product of a surfactant and GPS. Similarly small molecule TG14 also in U.S. Pat. No. 8,545,776, and the various small molecules such as GEN1, GEN2, and GEN3 are described in US Published Patent Applications 2011/0212006 and 2012/0148462 are reaction products of some of these items. In at least one embodiment the invention excludes TG14, DG12, GEN1, GEN2, and GEN3.

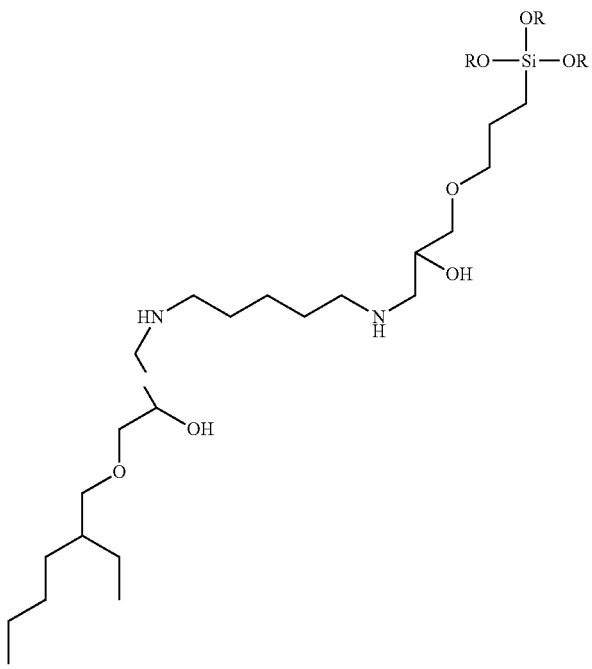
GEN 1
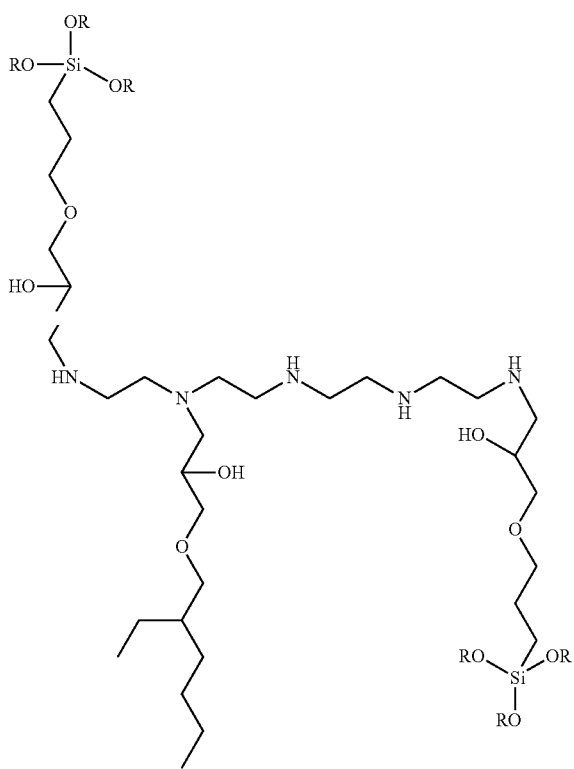
GEN 2

GEN 3

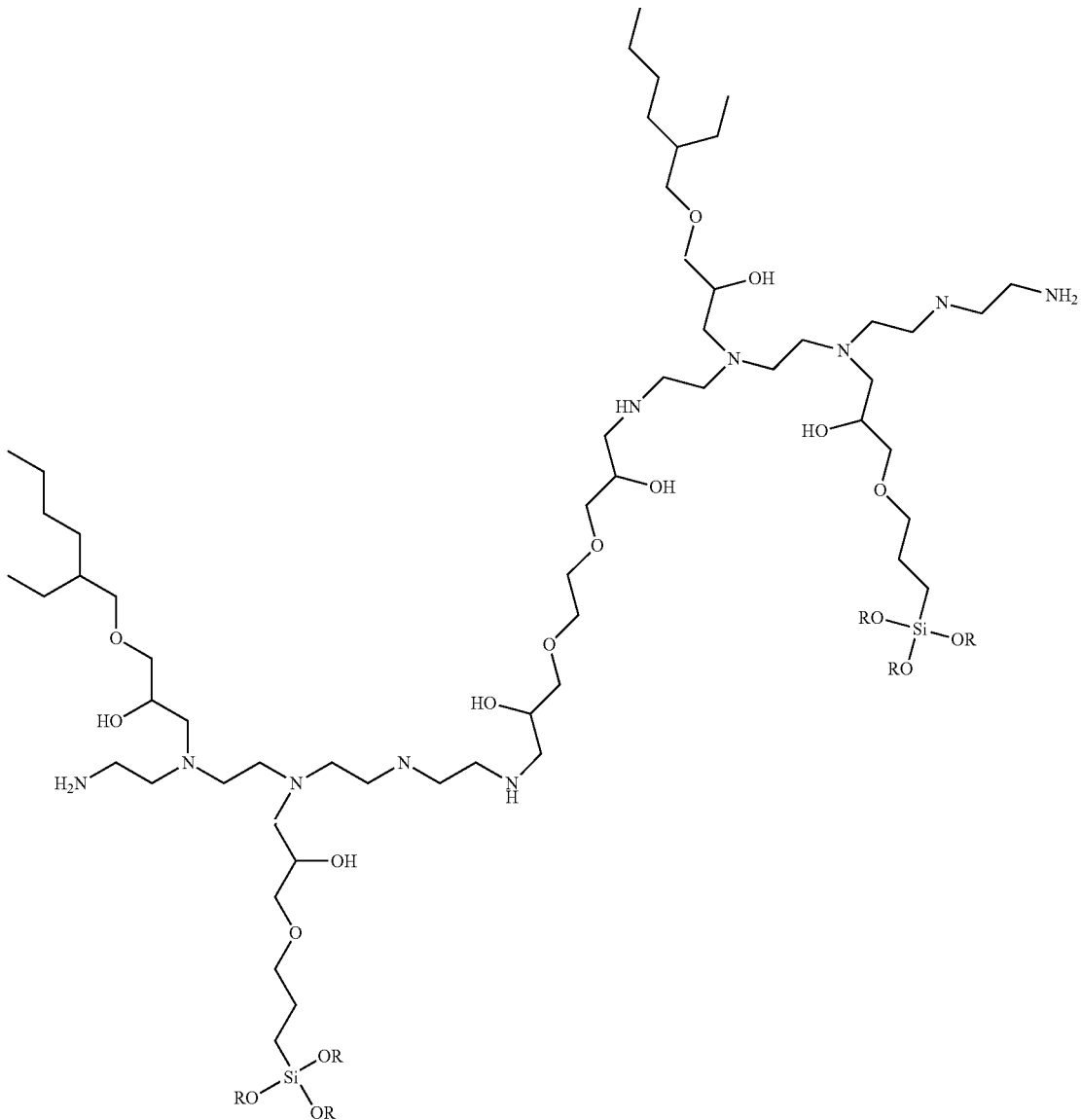

In at least one embodiment the reaction product is formed at least in part by allowing two or more of the reactants to contact each other for a period of time between 1 minute and 55 days, and/or by allowing the reactants to contact each other at a temperature of between 20° C. and 500° C. The invention encompasses adding any of some or all the reactants to the reaction simultaneously and/or in any sequential order. Any portion of the reaction may occur within one or more of: a liquid medium, a water medium, in the presence of acid and/or base, and or under acidic, basic, or neutral conditions. Any portion of the reaction may occur at least in part in the presence of one or more catalysts.

In at least one embodiment the surfactant includes but is not limited to one selected from the list consisting of: ethoxylated fatty alcohols, ethoxylated fatty amines, fatty amines, G12A7, G12A4, G17A3, G9A6, G9A8, 18M20, 18M2, 16M2, DPD, OPD, OLA, and any combination thereof. FIG. 3, FIG. 4, FIG. 5 and FIG. 6 are tables illustrating some of the possible reaction product combinations encompassed by this embodiment.

In at least one embodiment the epoxide binder is according to one or more of the formulas (I) and (II):

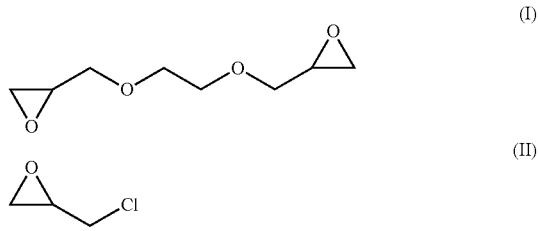

In at least one embodiment the hydrophobe is a C8-C10 aliphatic glycidyl ether. The hydrophobe may be may be described as a linear or branched, aromatic or aliphatic hydrocarbon chain which may optionally contain an ether linkage or additional functional end group such as an epoxide which allows the hydrophobe to be reacted with and attached to other molecules. The hydrocarbon chain may consist of between 3 and 50 carbon atoms In at least one embodiment the hydrophobe is according to formula (III) where R' is a linear or branched hydrocarbon chain containing at least 3 carbon atoms:

(III)

In at least one embodiment, the amine binder is selected from a linear or branched, aliphatic or cycloaliphatic monoamines, diamines, triamines, butamines, and pentamines. The total number of carbon atoms in the amine is preferred to be less than 30 and more preferred to be less than 20. In at least one embodiment the amine is selected from a list consisting of: tetraethylene pentamine, ethylene diamene, and any combination thereof.

In at least one embodiment, an amine small molecule is reacted with both 3-glycidoxypropyltrialkoxysilane (GPS) and a hydrophobic molecule to form a DSP inhibition composition. The hydrophobic molecule is an amine-reactive compound having an amine-reactive functional group such as glycidyl, chloro, bromo, or isocyanato groups. Besides the amine-reactive group, the hydrophobic molecule has at least one $C_3$-$C_{22}$ hydrophobic carbon chain, aromatic or aliphatic, linear or branched.

In at least one embodiment, the amine molecule is selected from linear or branched, aliphatic or cycloaliphatic monoamines or diamines. The total number of carbon atoms in the amine is preferred to be less than 30 and more preferred to be less than 20.

In at least one embodiment the amine is selected from a list consisting of: isophoronediamine, xylenediamine, bis(aminomethyl)cyclohexane, hexanediamine, C,C,C-trimethylhexanediamine, methylene bis(aminocyclohexane), saturated fatty amines, unsaturated fatty amines such as oleylamine and soyamine, N-fatty-1,3-propanediamine such as cocoalkylpropanediamine, oleylpropanediamine, dodecylpropanediamine, hydrogenized tallowalkylpropanediamine, and tallowalkylpropanediamine and any combination thereof.

In at least one embodiment the reaction product is Product P, which is a reaction product of GPS with a surfactant having a formula of:

In at least one embodiment the reaction product is Product U, which is a reaction product of GPS with a surfactant and a hydrophobe having a formula of:

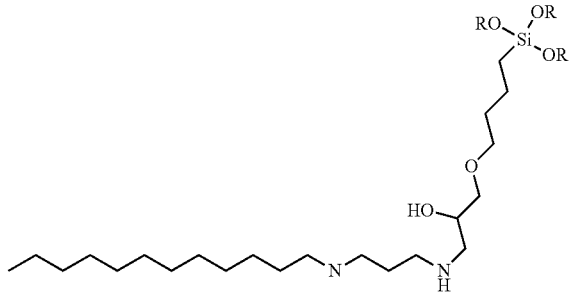

In at least one embodiment the reaction product is Product X, which is a reaction product of GPS with a surfactant, a hydrophobe and an epoxide binder having a formula illustrated in FIG. 1.

In at least one embodiment the reaction product is Product BB, which is a reaction product of GPS with a surfactant, a hydrophobe, an epoxide binder and an amine binder having a formula illustrated in FIG. 2.

In at least one embodiment the reaction conditions results in the formation of two or more of the aforementioned and incorporated reaction products. In at least one embodiment the composition introduced to address DSP contains one, two, or more of the aforementioned and incorporated reaction products.

In at least one embodiment the resulting surfactant based small molecules are added to a dilute caustic solution prior to addition to the process stream.

These small molecules reduce the amount of DSP scale formed and thereby prevents its accumulation on Bayer process equipment.

The effectiveness of these small molecules was unexpected as the prior art teaches that only high molecular weight polymers are effective. Polymer effectiveness was presumed to depend on their hydrophobic nature and their size. This was confirmed by the fact that cross-linked polymers are even more effective than single chain polymers. As a result it was assumed that small molecules only serve as building blocks for these polymers and are not effective in their own right. (WO 2008/045677 [0030]). Furthermore, the scientific literature states "small molecules containing" . . . "[an] Si—$O_3$ grouping are not effective in preventing sodalite scaling" . . . because . . . "[t]he bulky group" . . . "is essential [in] keeping the molecule from being incorporated into the growing sodalite." Page 57 ¶ 9 *Light Metals* 2008, (2008). However it has recently been discovered that in fact, as further explained in the provided examples, small molecules such as those described herein are actually effective at reducing DSP scale.

It is believed that there are at least three advantages to using a small molecule-based inhibitor as opposed to a polymeric inhibitor with multiple repeating units of silane and hydrophobes. A first advantage is that the smaller molecular weight of the product means that there are a larger number of active, inhibiting moieties available around the DSP seed crystal sites at the DSP formation stage. A second advantage is that the lower molecular weight allows for an increased rate of diffusion of the inhibitor, which in turn favors fast attachment of the inhibitor molecules onto DSP seed crystals. A third advantage is that the lower molecular weight avoids high product viscosity and so makes handling and injection into the Bayer process stream more convenient and effective.

In at least one embodiment DSP scale is addressed using one or more of the compositions and/or methods of application described in U.S. patent applications Ser. Nos. 13/035,124, 13/403,282, 13/791,577, 14/011,051, U.S. Pat. Nos. 5,314,626, 6,814,873, 7,390,415, 7,442,755, 7,763,698, International Patent Applications WO 02/070411, WO 2008/045677, WO 2012/115769, and US Published Patent Applications 2004/0162406, 2004/0011744, 2010/0256317, 2011/0076209, 2011/0212006, and 2012/0148462.

Examples

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A number of reaction products were produced using the reactants listed in FIG. 3, FIG. 4, and FIG. 5 according to the various methods described below. The mass of surfactant added to all reactions was 5 g. Masses of other reactants were calculated from the mole ratios described in FIGS. 3, 4 and 5.

Hydroxy-Terminated Surfactants

Method I: A mixture of surfactant (di-hydroxy terminated) and hydrophobe was stirred and heated at 65° C. A solution of NaOH (50% in water) was added and the mixture left for 30 min at 65° C. Glycidoxypropyltrimethoxysilane was then added and the mixture left for 2 h at 65° C. The reaction mixture was cooled then diluted to 5% w/w in 20 g/L NaOH solution.

NaOH was added at 2 molar equivalents to that of added epoxide.

For A-O products, Method I was used excluding incorporation of hydrophobe.

Amino-Terminated Surfactants

Method II: Surfactant was stirred and heated at 65° C. Hydrophobe was added and the mixture left for 30 min at 65° C. Glycidoxypropyltrimethoxysilane was then added and the mixture left for 2 h at 65° C. The reaction mixture was cooled then diluted to 5% w/w in 20 g/L NaOH solution.

For products P and Q, Method II was used excluding incorporation of hydrophobe.

Method III: Surfactant was stirred and heated at 65° C. Epoxide binder was added and the mixture left for 30 min at 65° C. Glycidoxypropyltrimethoxysilane was then added and the mixture left for 2 h at 65° C. The reaction mixture was cooled then diluted to 5% w/w in 20 g/L NaOH solution.

Method IV: A mixture of surfactant and amine binder was stirred and heated at 65° C. Epoxide binder was added and the mixture left for 30 min at 65° C. Glycidoxypropyltrimethoxysilane was then added and the mixture left for 2 h at 65° C. The reaction mixture was cooled then diluted to 5% w/w in 20 g/L NaOH solution.

Products EE and FF were allowed to react for 60 min at 65° C. prior to addition of the glycidoxypropyltrimethoxysilane.

Method V: A mixture of surfactant and amine binder was stirred and heated at 65° C. Epoxide binder was slowly added to the mixture then left for 2 h total at 65° C. Glycidoxypropyltrimethoxysilane was then slowly added and the mixture left for 1 h total at 65° C. The reaction mixture was cooled then diluted to 5% w/w in 20 g/L NaOH solution.

Method VI: A mixture of surfactant, amine binder and DMSO was stirred and heated at 65° C. Epoxide binder was slowly added to the mixture then left for 3 h total at 65° C. Glycidoxypropyltrimethoxysilane was then slowly added to the mixture. After 30 min a sample was taken from the reaction mixture and added slowly to a stirred 20 g/L NaOH solution, diluting the sample to a concentration of 13.3% w/w.

Method VII: A mixture of surfactant and amine binder was stirred and heated at 65° C. Epoxide binder was slowly added to the mixture then left for 30 min total at 65° C. Glycidoxypropyltrimethoxysilane was then slowly added to the mixture. After 19 min a sample was taken from the reaction mixture and added slowly to a stirred 20 g/L NaOH solution, diluting the sample to a concentration of 10% w/w.

Method VIII: A mixture of surfactant and amine binder was stirred and heated at 65° C. Epoxide binder was slowly added to the mixture then left for 1 h total at 65° C. Glycidoxypropyltrimethoxysilane was then slowly added to the mixture. After 15 min a sample was taken from the reaction mixture and added slowly to a stirred 20 g/L NaOH solution, diluting the sample to a concentration of 10% w/w.

Method IX: A mixture of surfactant, amine binder and DMSO was stirred and heated at 65° C. Epoxide binder was slowly added to the mixture then left for 1 h total at 65° C. Glycidoxypropyltrimethoxysilane was then slowly added to the mixture and the mixture left for 1 h. The reaction mixture was cooled then diluted to 10% w/w in 20 g/L NaOH solution.

Method X: A mixture of surfactant, amine binder and DMSO was stirred and heated at 65° C. Epoxide binder was slowly added to the mixture then left for 3 h total at 65° C. Glycidoxypropyltrimethoxysilane was then slowly added to the mixture. After 16 min a sample was taken from the reaction mixture and added slowly to a stirred 20 g/L NaOH solution, diluting the sample to a concentration of 11.8%.

Method XI: The reaction mixture from Method X was left at 65° C. for a further 44 min post sampling, cooled then diluted to 11.8% w/w in 20 g/L NaOH solution.

Method XII: A mixture of surfactant, amine binder and DMSO was stirred and heated at 65° C. Epoxide binder was slowly added to the mixture then left for 2 h and 2 min total at 65° C. Glycidoxypropyltrimethoxysilane was then slowly added to the mixture. After 20 min a sample was taken from the reaction mixture and added slowly to a stirred 20 g/L NaOH solution, diluting the sample to a concentration of 11.8%.

Method XIII: The reaction mixture from Method XII was left at 65° C. for a further 40 min post sampling, cooled then diluted to 11.8% w/w in 20 g/L NaOH solution.

Results: Test 1 Bottle Test Method

Assessment of inhibition of DSP formation used test conditions similar to those previously used and published. To a stirred sample of plant spent liquor, a small volume of concentrated sodium metasilicate pentahydrate solution was added slowly so as to increase the amount of silica in the liquor (typically the concentration was increased by approximately 1 g/L as $SiO_2$). This "spiked" liquor was then split into batches of 500 mL for treatment by addition of the appropriate inhibitor at the desired dose. One batch of spiked liquor was kept as untreated liquor.

Each of the treated batches was then sub-sampled to deliver duplicate samples which were individually placed into 250 mL Nalgene polypropylene bottles and placed into a rotating water bath at 95° C. Duplicate untreated control samples were also included. After heating for 3 hours, the bottles were removed from the bath and the solids were collected by filtration, washed with hot water and dried in the oven at 110° C. After drying the resulting mass of DSP solids precipitated was weighed. The efficacy of the treatment was determined by comparing the mass of DSP precipitated from the individual treated samples to the untreated control samples in the same test.

Results are presented as a percent calculated as: (Average mass treated/Average mass untreated)×100. A value of 100% means no effective inhibition (same mass as untreated) while a value less than 100% indicates some inhibitory activity. Lower numbers indicate more effective inhibition.

Type 1.1 Ethoxylated Alcohol Surfactant/Siloxane

TABLE 1

| | % Sodalite Precipitated | | |
|---|---|---|---|
| | Dose (ppm) | | |
| Product | 80 | 120 | 160 |
| A | 88 | 75 | |
| A* | 78 | 73 | |
| A* | 66 | | 57 |
| B | 72 | | 61 |
| C | 72 | | 61 |
| D | 69 | 45 | |
| E | 70 | 61 | 61 |

*test repeated under the same test conditions as previous

Type 1.2 Ethoxylated Amine Surfactant/Siloxane

TABLE 2

| | % Sodalite Precipitated | | | | |
|---|---|---|---|---|---|
| | Dose (ppm) | | | | |
| Product | 80 | 120 | 160 | 200 | 220 |
| F | 77 | 91 | | | |
| G | 6 | | 0.6 | | |
| H | 16 | | 2 | | |
| H* | 8 | | 2 | | 1 |
| H* | 11 | | 2 | | 0.8 |
| J | 91 | 58 | | | |
| K | 36 | 11 | | | |
| L | 17 | 4 | | | |

TABLE 2-continued

| | % Sodalite Precipitated | | | | |
|---|---|---|---|---|---|
| | Dose (ppm) | | | | |
| Product | 80 | 120 | 160 | 200 | 220 |
| M | 23 | 6 | | | |
| M* | 28 | | 5 | 4 | |
| M* | 25 | | 6 | | |
| N | 27 | | 7 | | |
| O | 30 | | 4 | | |

*test repeated under the same test conditions as previous

Type 1.3 Fatty Amine Surfactant/Siloxane

TABLE 3

| | % Sodalite Precipitated | | |
|---|---|---|---|
| | Dose (ppm) | | |
| Product | 40 | 80 | 120 |
| P | 59 | 16 | 7 |
| Q | 43 | 58 | 48 |

Type 2.1 Ethoxylated Amine Surfactant/Siloxane/Hydrophobe

TABLE 4

| | % Sodalite Precipitated | |
|---|---|---|
| | Dose (ppm) | |
| Product | 80 | 120 |
| R | 95 | 101 |
| S | 71 | 81 |
| T | 33 | 9 |
| T* | 32 | 6 |

*test repeated under the same conditions as previous

Type 2.2 Fatty Amine Surfactant/Siloxane/Hydrophobe

TABLE 5

| | % Sodalite Precipitated | | |
|---|---|---|---|
| | Dose (ppm) | | |
| Product | 40 | 80 | 120 |
| U | | 13 | 9 |
| U* | 56 | 28 | 7 |
| V | | 86 | 72 |

*test repeated under the same conditions as previous

Type 3.1 Fatty Amine Surfactant/Siloxane/Epoxide Binder

TABLE 6

| | % Sodalite Precipitated | | | | | |
|---|---|---|---|---|---|---|
| | Dose (ppm) | | | | | |
| Product | 20 | 40 | 80 | 100 | 120 | 140 |
| X | | 37 | 3 | | 1 | |
| Y | | 22 | 4 | | 0.2 | |
| Y* | 58 | 28 | 13 | 8 | 4 | 3 |
| Y* | | 15 | 1.5 | | | 0.4 |

TABLE 6-continued

| | % Sodalite Precipitated | | | | | |
|---|---|---|---|---|---|---|
| | Dose (ppm) | | | | | |
| Product | 20 | 40 | 80 | 100 | 120 | 140 |
| Z | | 27 | 13 | | 5 | |
| ZA | | 52 | 3 | | 3 | |

*test repeated under the same conditions as previous tests

Type 4.1 Fatty Amine Surfactant/Siloxane/Amine Binder/Epoxide Binder

TABLE 7

| | % Sodalite Precipitated | | | | | |
|---|---|---|---|---|---|---|
| | Dose (ppm) | | | | | |
| Product | 10 | 20 | 40 | 60 | 80 | 140 |
| AA | | | 57 | | 11 | 4 |
| BB | | | 25 | | 4 | 0.1 |
| CC | | | 78 | | 45 | 0.7 |
| DD | | | 12 | | 0 | 0 |
| DD* | 90 | 73 | 18 | 0 | 0 | |
| EE | | | 84 | | 59 | 9 |
| FF | | | 49 | | 0 | 0 |
| FF* | 93 | 85 | 46 | 9 | 0 | |

*test repeated under the same conditions as previous

Results: Test 2 Bottle Test Method

Test 2 conditions were similar to those of Test 1 but were designed to assess the effect on the initial formation of DSP solids from solution. As a result, a shorter holding time for the precipitation step and an increased initial concentration (higher "spike") of silica in the liquor was used in this method. Data is again presented as a percent of mass precipitated compared to an undosed control sample.

Type 4.2 Fatty Amine Surfactant/Siloxane/Pentamine Binder/Epoxide Binder

TABLE 8

| | % Sodalite Precipitated | | |
|---|---|---|---|
| | Dose (ppm) | | |
| Product | 25 | 45 | 50 |
| JJ | | 36 | |
| DS | 40 | | 0 |
| ES | 18 | | 0 |
| FS | 55 | | 24 |
| GS | 50 | | 12 |

TABLE 9

| | % Sodalite Precipitated | | | | | | | | | | |
|---|---|---|---|---|---|---|---|---|---|---|---|
| | Dose (ppm) | | | | | | | | | | |
| Product | 20 | 25 | 30 | 40 | 45 | 50 | 60 | 80 | 100 | 200 | 400 |
| SA | | | | | | | | | 71 | 62 | |
| SB | | | | | | | | | 41 | 1.8 | 1 |
| SC | | | | | | | | | | 36 | 2.5 |
| SD | | | | | | | | | | 59 | 7 |
| SE | | | | | | | | | | 23 | 3.4 |
| SF | | | | | | | | | | 12.8 | 2.3 |
| SG | | | | | | | | | | 45 | 0 |
| SH | | | | | | | | | 78 | 57 | |
| SI | | | | | | | | | | 0 | 0 |
| SJ | | | | | | | | | | 26 | 0.3 |
| SK | | | | | | | | | | 70 | 27 |
| SL | | | | | | | | | | 7 | 2 |
| SM | | | | | | | | | 77 | 0 | 0 |
| SN | | | | | | | | | | 156 | 37 |
| SO | | | | | | | | | 24 | 14 | |
| SP | | | | | 97 | | 77 | | 3.6 | 0 | |
| SQ | | | | | 82 | | 62 | | 1.5 | 0 | |
| SR | | | | | | | | | 69 | 28 | |
| ST | | | | | 78 | | 33 | | 2 | 0 | |
| SU | | | | | 74 | | 77 | | 0 | 0 | |
| SV | | | | | | | | | 30 | 4 | |
| SW | | | | | 56 | | 27 | | 0.5 | | |
| SX | | | | | | | | | 41 | 2 | |
| AS | | | 70 | | | 12 | | | | | |
| BS | | | 40 | | | 3.3 | | | | | |
| CS | | | 32 | | | 0 | | | | | |
| DS | | | 40 | | | 0 | | | | | |
| ES | | | 18 | | | 0 | | | | | |
| FS | | | 55 | | | 24 | | | | | |
| GS | | | 50 | | | 12 | | | | | |
| HS | 31 | | | | | 0 | | | | | |

Type 4.3 Fatty Monoamine Surfactant/Siloxane/Pentamine Binder/Epoxide Binder

TABLE 10

| | % Sodalite Precipitated | |
|---|---|---|
| | Dose (ppm) | |
| Product | 20 | 40 |
| LL | 44 | 42 |
| MM | 47 | 41 |

Test 2—Surfactant-Based Molecules Versus Gen 2 and Gen 3

TABLE 11

| | % Sodalite Precipitated | | | | | | | | | | |
|---|---|---|---|---|---|---|---|---|---|---|---|
| | Dose (ppm) | | | | | | | | | | |
| Product | 20 | 25 | 30 | 50 | 100 | 200 | 400 | 500 | 800 | 1100 | 1200 |
| Gen2 | | | | 106 | 114 | 76 | | 39 | 40 | 37 | |
| Gen3 | | | | 88 | 92 | 81 | 55 | | 32 | | 32 |
| DD | | | | 103 | 79 | 41 | 1 | | | | |
| HS | 58 | 16 | 0 | | | | | | | | |

Results in table 11 above demonstrate the surprising difference between the inhibitory effects of previously identified small molecule inhibitors (Gen 2 and Gen 3 products) and surfactant based products (DD and HS). The latter are effective in eliminating DSP formation at doses as low as 30 ppm. However, for the Gen 2 and Gen 3 products some DSP precipitation still occurs under these test conditions even at doses greater than 1000 ppm. Given the efficacy of the Gen 2 and Gen 3 products under test 1 conditions, such a result is unexpected and novel.

Results: Test 3—Metal Coupon Test

Test 3 conditions were the same as test 2 however, metal coupons were included in the bottles and small amounts of DSP were precipitated onto the surface of the metal. As shown in FIG. 6, SEM analysis of coupon tests using the invention shows that significant amounts of DSP were precipitated onto the untreated coupon, as well as those treated with extreme doses (1000 ppm) of GEN2 and GEN3 products. However, on the coupon subjected to liquor treated with the surfactant based inhibitor (KK) at relatively low dose (100 ppm) significantly less DSP was deposited. This indicates substantial and surprising efficacy of the surfactant based small molecule in inhibiting the formation of DSP scale.

TABLE 2.15

Treatment of liquor exposed to metal coupons in test method 3.

| Coupon | Product type | Product | Dose (ppm) |
|---|---|---|---|
| I | No Treatment | N/A | N/A |
| II | Product Type D | GEN2 | 1,000 |
| III | Product Type E | GEN3 | 1,000 |
| IV | Product Type 4.2 | KK | 100 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of reducing aluminosilicate containing scale in a Bayer process comprising:
    adding to a Bayer liquor a non-polymeric reaction product resulting from the reaction of dodecyl-1,3-propanediamine, tetraethylenepentamine, ethylenediamine, and an epoxide binder;
    and a glycidoxyalkyltrimethoxysilane.

2. The method of claim 1, wherein the epoxide binder is selected from epichlorohydrin and ethylene glycol diglycidylether.

3. The method of claim 1, wherein the epoxide binder is epichlorohydrin.

4. The method of claim 1, wherein the epoxide binder is ethylene glycol diglycidylether.

5. The method of claim 1, wherein the glycidoxyalkyltrimethoxysilane is 3-glycidoxypropyltrimethoxysilane.

6. The method of claim 1, wherein the epoxide binder is a molecule according to formulas (I), (II), and any combination thereof:

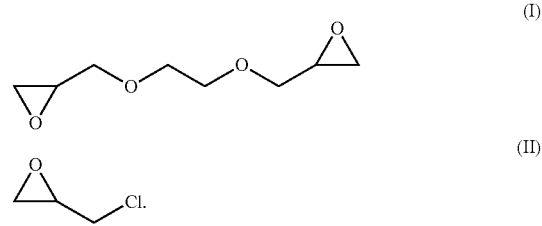

7. The method of claim 1, wherein the epoxide binder is a composition according to formula (I):

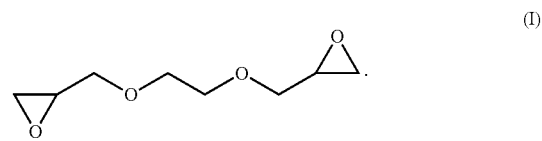 [SMILES: C(COCC1CO1)OCC1CO1]

8. The method of claim 1, wherein the epoxide binder is a composition according to formula (II):

9. The method of claim 1, the non-polymeric reaction product resulting from the reaction of items further comprising a hydrophobe, wherein the hydrophobe is a C8-C10 aliphatic glycidyl ether.

10. The method of claim 1, wherein the non-polymeric reaction product has a molecular weight of less than 500 daltons.

11. The method of claim 1, wherein the non-polymeric reaction product is formed according to one of the methods selected from the group consisting of Methods I, II, III, IV, V, VI, VII, VIII, IX, X, XI, XII, and XIII, and any combination thereof.

12. The method of claim 1, wherein the non-polymeric reaction product is added to the Bayer liquor upstream of or at a heat exchanger.

13. The method of claim 1, wherein the dodecyl-1,3-propanediamine, the tetraethylenepentamine, the ethylenediamine, the epoxide binder, and the glycidoxyalkyltrimethoxysilane are reacted at a molar ratio of about 2:1:1:3:1, respectively.

14. The method of claim 1, wherein the dodecyl-1,3-propanediamine, the tetraethylenepentamine, the ethylenediamine, the epoxide binder, and the glycidoxyalkyltrimethoxysilane are reacted at a molar ratio of about 2:1:1:3:2, respectively.

15. The method of claim 1, wherein the dodecyl-1,3-propanediamine, the tetraethylenepentamine, the ethylenediamine, the epoxide binder, and the glycidoxyalkyltrimethoxysilane are reacted at a molar ratio of about 2:1:1:3:3, respectively.

* * * * *